United States Patent [19]
Sugiura

[11] Patent Number: 5,924,517
[45] Date of Patent: Jul. 20, 1999

[54] POWER STEERING DEVICE

[75] Inventor: Akehito Sugiura, Heikinan, Japan

[73] Assignee: Chuohatsujo Kabushiki Kaisha, Nagoya, Japan

[21] Appl. No.: 08/902,785

[22] Filed: Jul. 30, 1997

[30] Foreign Application Priority Data

Jul. 31, 1996 [JP] Japan .................................. 8-219399

[51] Int. Cl.⁶ .................................................. B62D 5/09
[52] U.S. Cl. .......................................................... 180/417
[58] Field of Search .................................. 180/400, 417, 180/425, 430

[56] References Cited

U.S. PATENT DOCUMENTS 5,090,512  2/1992  Mullet et al. ........................... 180/236
5,598,897  2/1997  Sugiura ................................... 180/417

Primary Examiner—Kevin Hurley
Attorney, Agent, or Firm—Lackenbach Siegel Marzullo Aronson & Greenspan, P.C.

[57] ABSTRACT

In the power steering device adapted to transmit a steering force to the front wheels via the pair of cables subjected to a tensile force, there is an apprehension that the cables might be unacceptably slacked to deteriorate the steering performance. To avoid such apprehension, at least one of two casings separately housing a drum on the side of the steering wheel and a drum on the side of the power cylinder is provided with a novel tensioner functioning to tension the inner cables by pressing the rollers against the respective inner cables under the biasing effect of the spring.

5 Claims, 7 Drawing Sheets

POWER STEERING DEVICE

BACKGROUND OF THE INVENTION

1. Field of the Invention

The present invention relates to a power steering device for motor car using a pair of control cables including respective inner cables subjected to a tensile force and a power cylinder, and more particularly to such power steering device for motor car allowing a play of the inner cables due to factors such as elongation thereof to be effectively compensated.

2. Description of the Prior Art

U.S. Pat. No. 5,598,897 previously issued to the applicant of the present patent application discloses a power steering device comprising a power cylinder including a piston rod coupled at its longitudinally opposite ends to front wheels via a steering link mechanism, a control valve of rotary type adapted for direction control of pressurized fluid supplied to and simultaneously discharged from said power cylinder, a drum on the side of said valve coupled to a rotor of said control valve, another drum directly coupled to a steering wheel, and a pair of control cables each consisting of a flexible outer tube and an inner cable slidably extending within said outer tube and wound around said drums so that said inner cables are alternately subjected to a tensile force as said drum directly coupled to the steering wheel is rotated in alternate directions.

SUMMARY OF THE INVENTION

However, the invention disclosed in the above-mentioned U.S. Patent has left behind several problems unsolved. Specifically, initial slack of the inner cables can be removed by adjusting a length of each outer tube during installation thereof, but it is difficult for this prior art to provide the inner cables with a proper tension. Even if the inner cables have been provided with a proper initial tension, there is an apprehension that the inner cables might be progressively slacked by some causes as they are used and deteriorate a steering performance of the device.

Even when there is no permanent slack in the inner cables, there remains an apprehension that, within the pair of control cables operating in a circuit mode, one of the inner cables might be elastically stretched under a large load and simultaneously the other inner cable might be correspondingly slackened. With a consequence, a histeresis in the "torque-angle" characteristics of the steering wheel may increase to deteriorate the steering performance of the device.

These problems are solved, according to the invention, by providing a tensioner within at least one of said two casings separately housing said two drums, said tensioner functioning to press the rollers against the inner cables, respectively, under a biasing effect of a spring. The tensioner effectively compensates slack and/or elongation of the inner cables under the biasing effect of said spring and maintains a good steering performance of the device. In addition, the casing is provided a sensor adapted to quantitatively detect a deformation of the spring, on one hand, and there is provided an alarm device adapted to be actuated when an output signal of said sensor exceeds a predetermined value. In this way, an abnormal elongation of the inner cable can be detected and alarmed to avoid an accident due to breakage of the inner cable.

DESCRIPTION OF THE PREFERRED EMBODIMENTS

Figure 1:
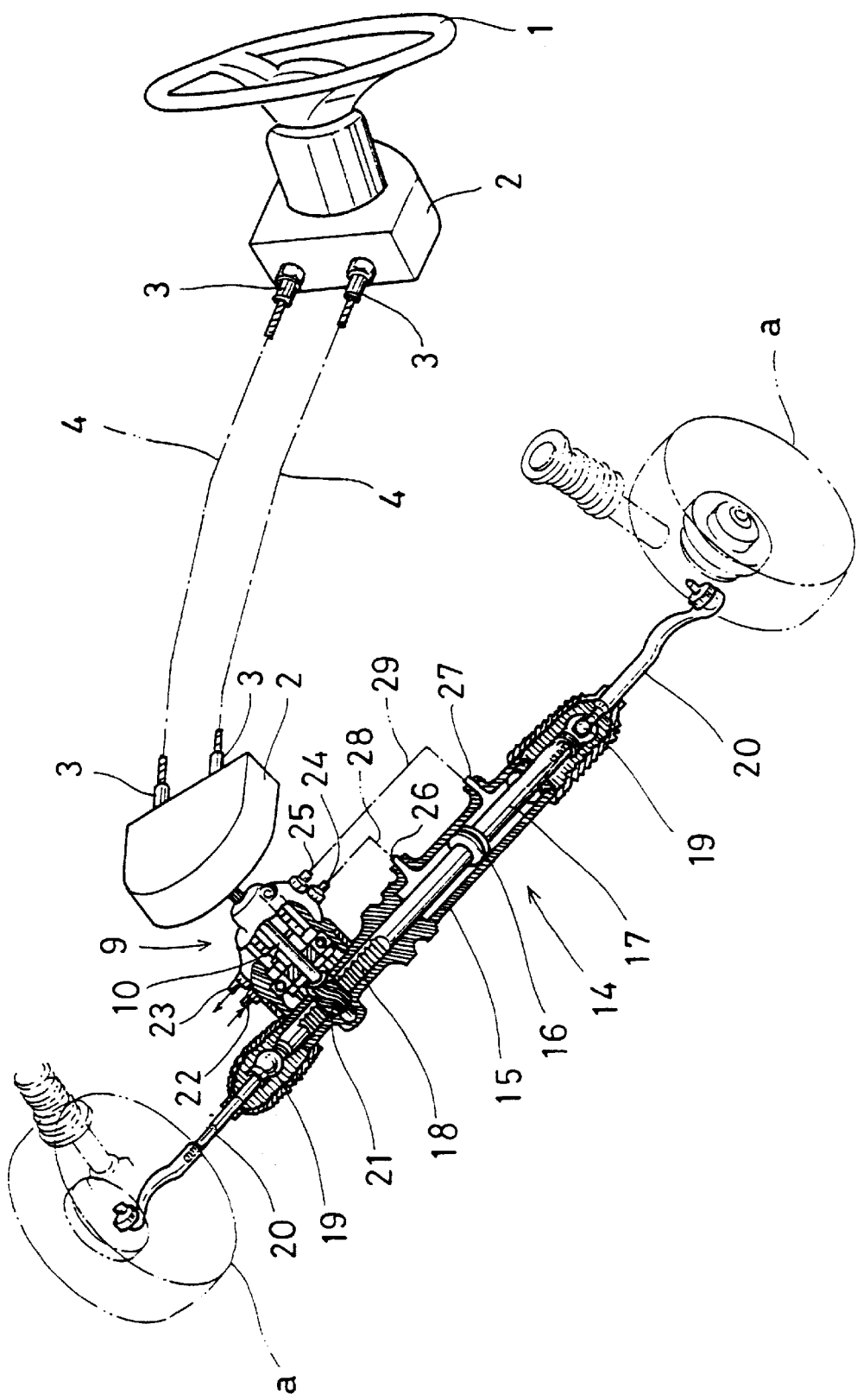
FIG. 1 is a perspective view schematically showing an embodiment of the invention as partially broken away.

Details of the invention will be more fully understood from the following description of embodiments given hereunder in reference with the accompanying drawings.

Referring to the drawings, reference numeral 1 designates a steering wheel which is rotatably supported by a casing 2 mounted on a car body.

Figure 2:
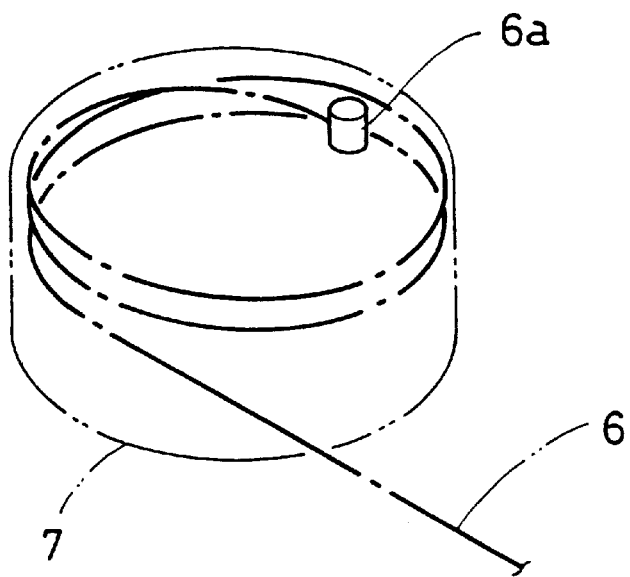
FIG. 2 is a perspective view illustrating a manner in which one of inner cables is wound around a drum.
Figure 3:
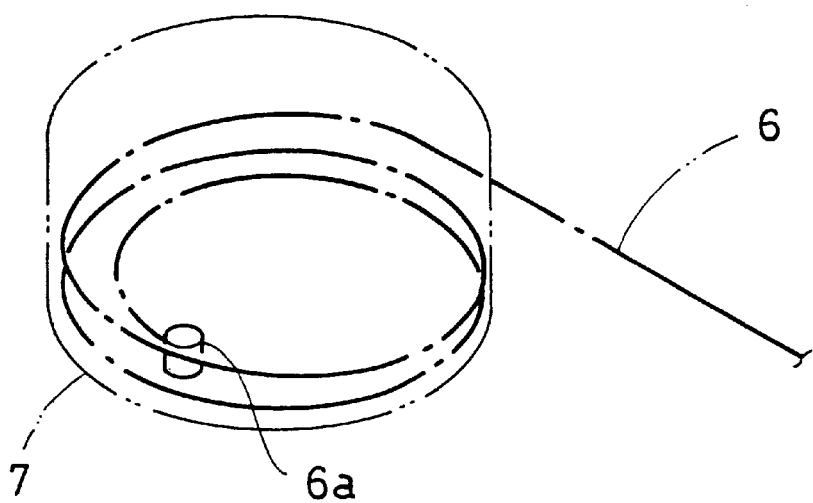
FIG. 3 is a view similar to FIG. 2 illustrating a manner in which the other inner cable is wound around a drum.

A steering mechanism provided in a front area of the car body includes a casing 2 which has a configuration identical to the first-mentioned casing 2. A pair of flexible control cables 4 extend between these casings 2, 2 and outer tubes 5 of these cables 4 are fixed at their opposite ends to cylindrical fittings 3 provided on mutually facing surfaces of the respective casings 2, 2. Each of the control cables 4 comprises said outer tube 5 and an inner cable 6 slidably extending within said outer tube 5. As will be seen in FIGS. 4 and 5, the cylindrical fittings 3 are caulked around the respective ends of the outer tubes 5 and male screws 11 formed around them are threaded in nuts 12 fixed to the respective casings 2. Operative length of the control cables 4 is adjusted by rotating the cylindrical fittings 3 and this operative length is fixed by lock nuts 13. The inner cables 6 are wound around respective drums 7 rotatably supported within the respective casings 2. As will be apparent from FIGS. 2 and 3, directions in which the pair of inner cables 6 are wound around the respective drums 7 are opposite to each other and respective ends 6a of said inner cables 6 are fixed to opposite end surfaces of the respective drums 7. A rotary shaft 8 of each drum 7 projects out from one of its opposite end surfaces. The projected rotary shafts 8 are coupled to a rotary shaft of the wheel 1 on the side of the wheel 1 and coupled to a rotor 10 of a rotary valve 9 on the side of the steering mechanism. The rotary valve 9 will be described later more in detail.

Referring again to FIG. 1, reference numeral 14 designates a power cylinder comprising a cylinder tube 15 and a piston 16 adapted to be slidably moved therein. One end of a piston rod 17 fixed to the piston 16 is extended so as to form a rack 18 and longitudinally opposite ends of the piston rod 17 are coupled by ball joints 19 to tie rods 20, respectively, which are, in turn, coupled to front wheels a by knuckle arms (not shown), respectively.

It should be understood that, in the following description, said tie rods 20, said knuckle arms and the other components associated with one another will be generally referred to as a steering link mechanism.

A pinion 21 is fixed on the rotor 10 of the rotary valve 9 and engaged with the rack 18.

The rotary valve 9 has an inlet 22 connected to a hydraulic pump (not shown), an outlet 23 connected to a reservoir (not shown) and additional two ports 24, 25 which are connected by pipes 28, 29, respectively, to corresponding two ports 26, 27 of the cylinder tube 15. With such arrangement, pressurized fluid is supplied to the cylinder tube 15 at one side of the piston 16 and discharged therefrom at the other side of the piston 16, as the rotor 10 is rotated in one direction. Inversely, the pressurized fluid is supplied to the cylinder tube 15 at said other side of the piston 16 and discharged therefrom at said one side of the piston 16, as the rotor 10 is rotated in the other direction. In this manner, the piston 16 is actuated together with the piston rod 17.

The arrangement disclosed in the previously mentioned U.S. Pat. No. 5,598,897 has been described hereinabove and this arrangement of well known art operates in a manner as follows:

As the wheel 1 is rotated in one direction, one of the inner cables 6 extending within the pair of control cables 4 wound around the drum 7 on the side of the wheel 1 and the drum 7 on the side of the steering mechanism is taken up on the drum 7 on the side of the wheel 1 and delivered from the drum 7 on the side of the steering mechanism. As a result, this drum 7 is rotated together with its rotary shaft 8 in one direction.

Simultaneously, the other inner cable 6 is delivered from the drum 7 on the side of the wheel 1 and taken up on the drum 7 on the side of the steering mechanism.

Similarly, rotation of the wheel 1 in the other direction causes the drum 7 and its rotary shaft 8 on the side of steering mechanism to be rotated in the other direction.

As the rotary shaft 8 of the drum 7 on the side of steering mechanism is rotated in one direction, the rotor coupled to said rotary shaft 8 is rotated in the same direction and the piston rod 17 tends to be moved in one direction under the effect of engagement of the pinion 21 with the rack 18. Simultaneously, rotation of the rotor 10 causes the pressurized fluid to be supplied from one of the ports 24, 25 of the rotary valve 9 to one of the ports 26, 27 of the power cylinder 14. Consequently, the piston rod 17 is moved in the same direction as has been described just above and the front wheels a are steered by the steering link mechanism in one direction.

Similarly, the front wheels a are steered by said mechanism in the other direction as the rotary shaft 8 of the drum 7 on the side of the steering mechanism is rotated in the other direction.

Figure 4:
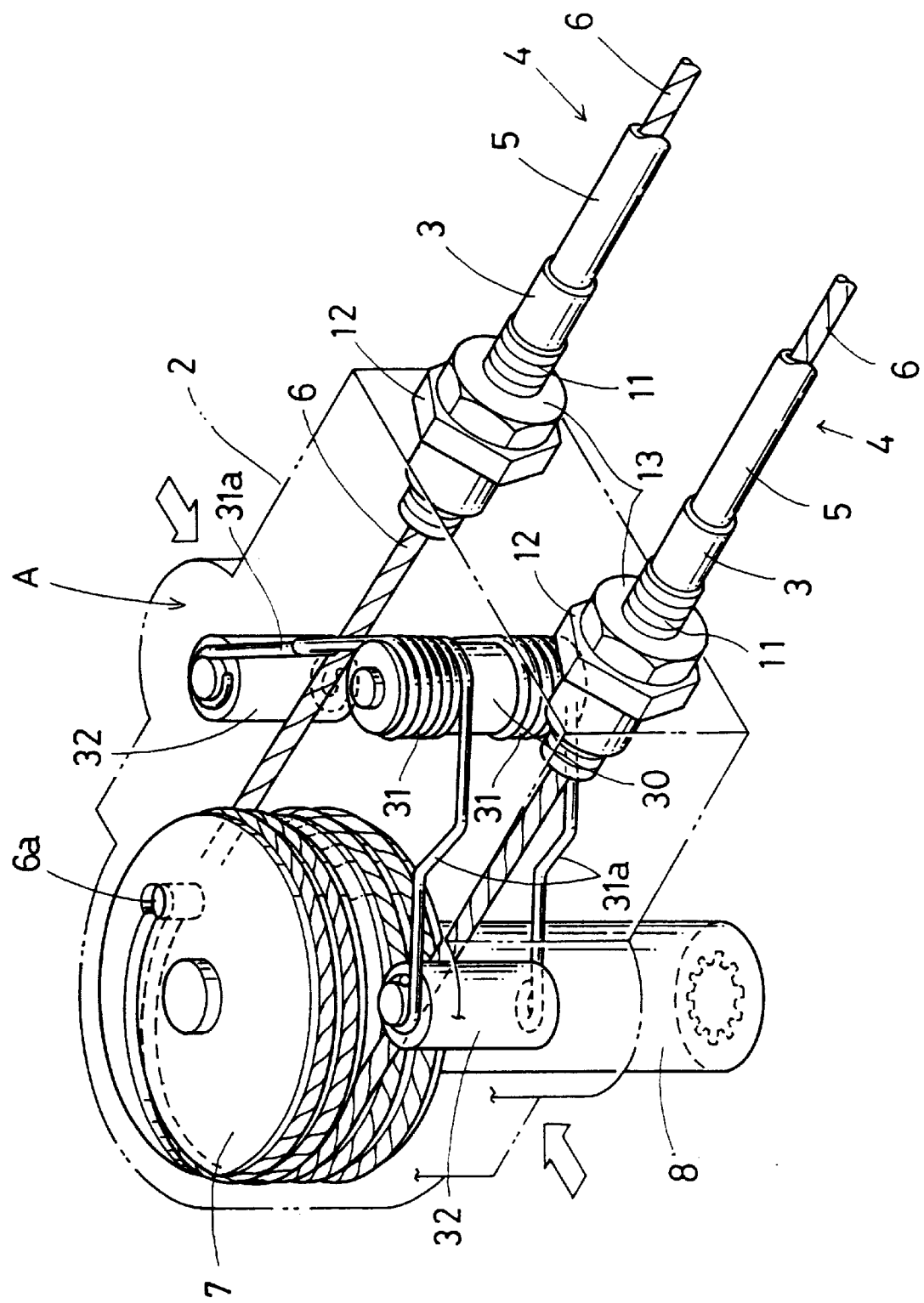
FIG. 4 is a scale-enlarged perspective view showing an embodiment of a tensioner.

Now a tensioner A characterizing the invention will be described. Referring to FIG. 4, there is provided within each casing 2 between the pair of inner cables 6 a shaft 30 supported therein in parallel to the rotary shaft 8 of the drum 7. Torsion coil springs 31 are wound around upper and lower ends of this shaft 30, each of said torsion coil springs 31 comprising a length of wire being wound so that its opposite ends defining respective arms 31a normally biased to be closed. These pairs of arms 31a are forcibly opened against the biasing force as has been described above and anchored on upper and lower ends of respective rollers 32 provided outside the respective inner cables 6. Under elastic forces of these torsion coil springs 31, the rollers 32 press the respective inner cables 6 inward, as shown by arrows in FIGS. 4 and 5 so as to tension the respective inner cables 6. A level of the tension given by the roller 32 depends on the elastic force of the torsion coil spring 6.

The tensioner A is provided with a sensor 33 adapted to detect when the inner cable 6 is abnormally deflected due to, for example, unacceptable elongation of the inner cable 6, which might lead to breakage thereof.

Figure 5:
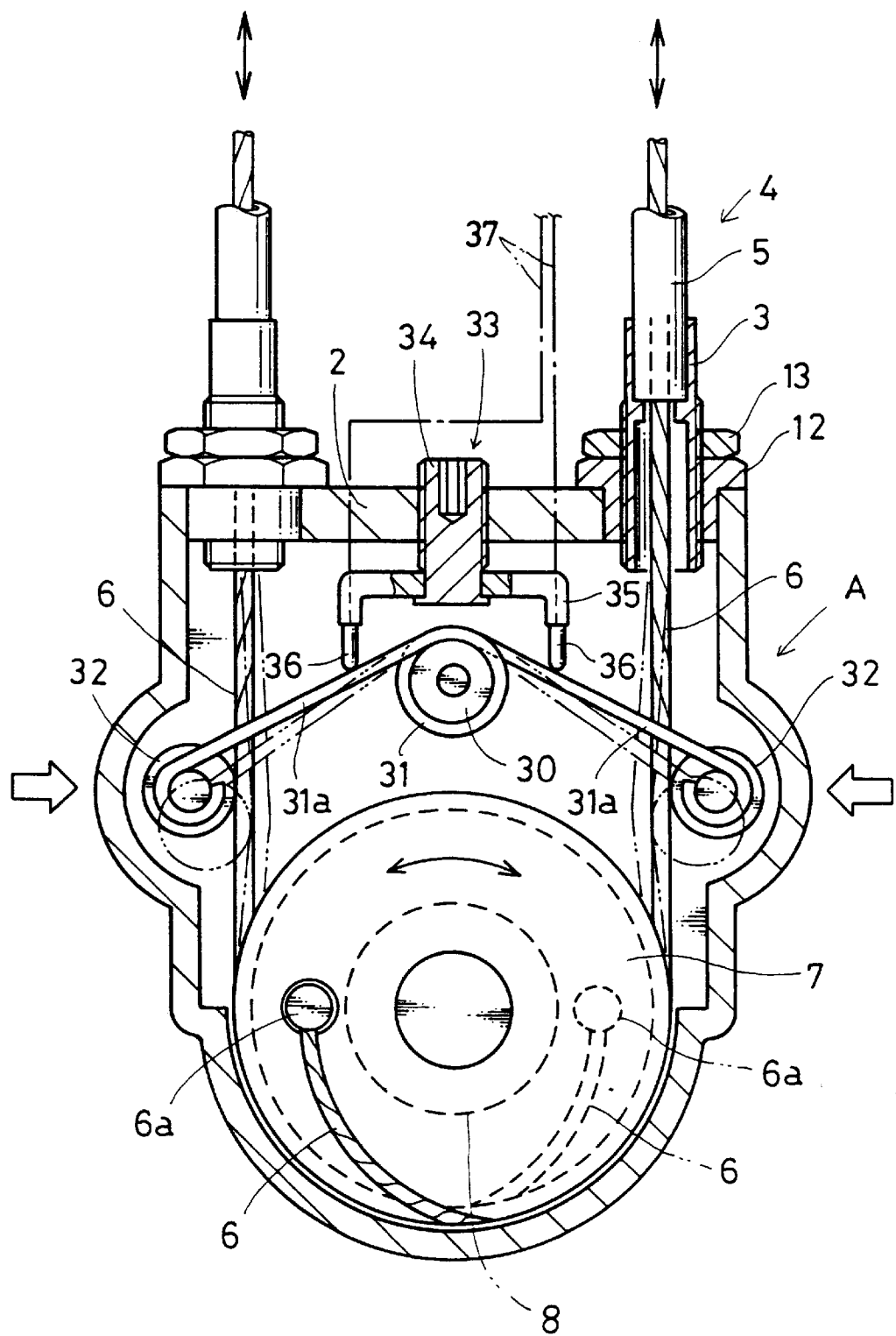
FIG. 5 is a sectional view showing this tensioner.
Figure 6:
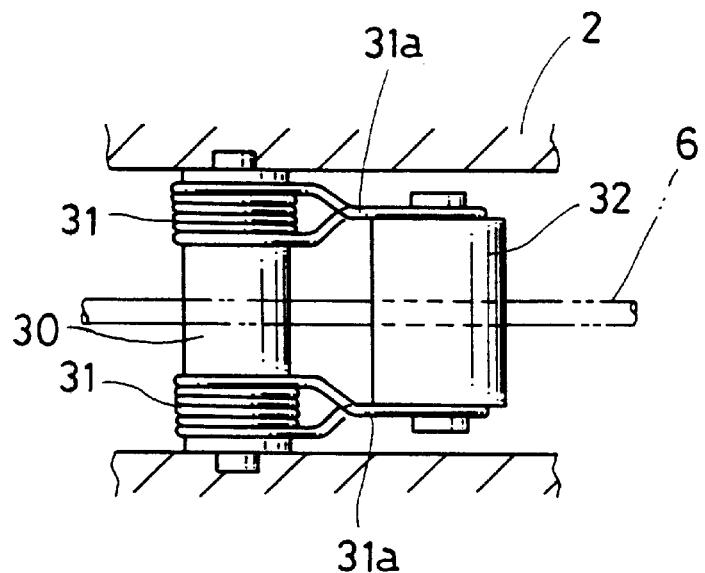
FIG. 6 is a scale-enlarged side view showing a part of this tensioner.

As shown in FIG. 5, the sensor 33 comprises a screw rod 34 threaded into the casing 2, a supporting arm 35 laterally extending in opposite directions from a forward end of said screw rod 34 so as to be rotatable relative not to the casing 2 but to said screw rod 34 and a pair of strain detectors 36 projecting from opposite ends of said supporting arm 35. Each of said strain detectors 36 comprises an elastic strip or a piezo-electric element carrying thereon a strain gauge. Threading of the screw rod 34 into the casing 2 causes the strain detectors 36 to be elastically deformed and thereby to press the arms 31a of the respective torsion coil springs 31. These strain detectors 36 are connected by lead wire to alarm means such as a buzzer via a comparator (not shown).

Even when one of the inner cables 6 is elastically stretched and the other inner cable 6 is temporarily slackened due to, for example, an excessive load or even if a permanent elongation of the inner cables 6 occurs, the inner cables 6 are maintained at a tension required for a normal steering so far as said stretch or permanent elongation is of a value less than a predetermined value, because said inner cables 6 are tensioned by the respective rollers 32 under the effect of the respective torsion coil springs 31. Stretch or elongation of the inner cable 6 is reflected by an angular displacement of the torsion coil spring's arm 31a and such angular displacement is converted by the strain detector 36 to corresponding electric signal. If said stretch or elongation of the inner cable 6 increases to a degree at which the steering might be affected or the inner cable 6 itself might be broken and exceeds a preset value of the comparator, the alarm means will be actuated for security.

Figure 7:
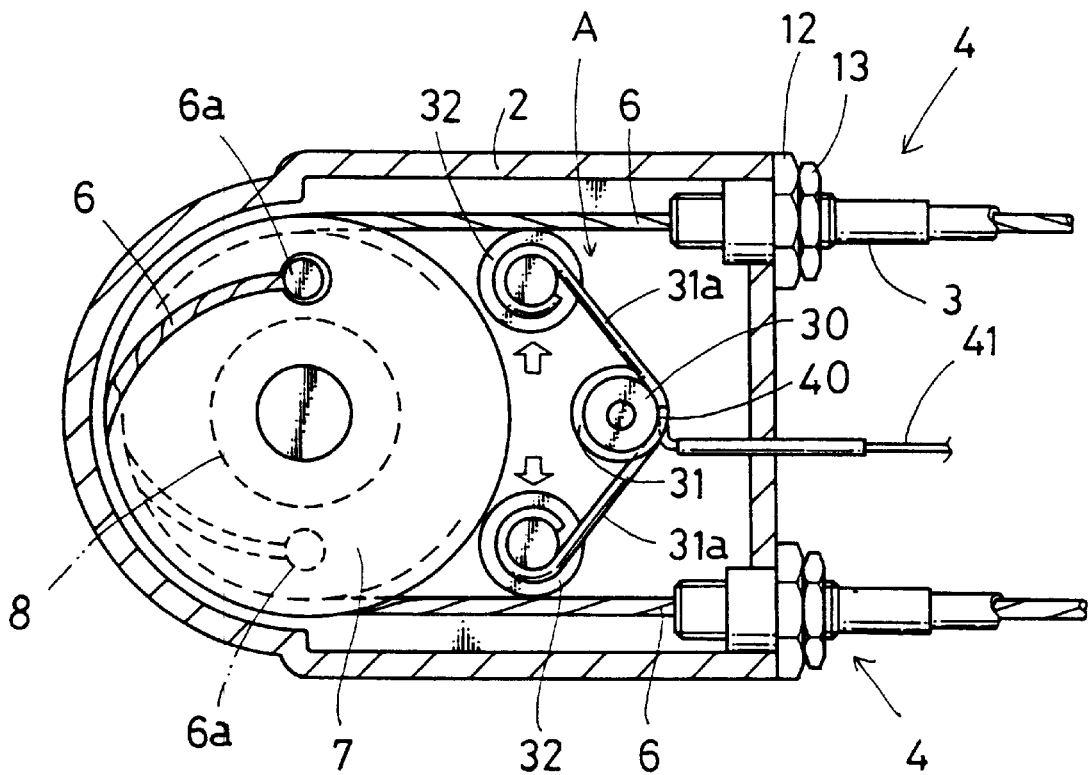
FIG. 7 is a sectional view showing another embodiment of the tensioner.

FIG. 7 shows another embodiment of the invention which is similar to the embodiment shown by FIGS. 1–6 in construction as well as operation except several aspects: Specifically, the arms 31a of the respective torsion coil springs 31 are normally biased to be opened outward and therefore the rollers 32 function to tension the respective inner cables 6 by pressing them outward as indicated by arrows in FIG. 7; and deflections of the torsion coil springs 31 are converted by strain gauges 40 fixed to coil portions of these springs 31 to corresponding electric signals and applied to the alarm means by lead wire 41. This embodiment advantageously allows the casing 2 to be made compact and thereby to be easily installed within a limited space of the engine room since the rollers 32 are placed inside the inner cables 6, respectively.

Figure 8:
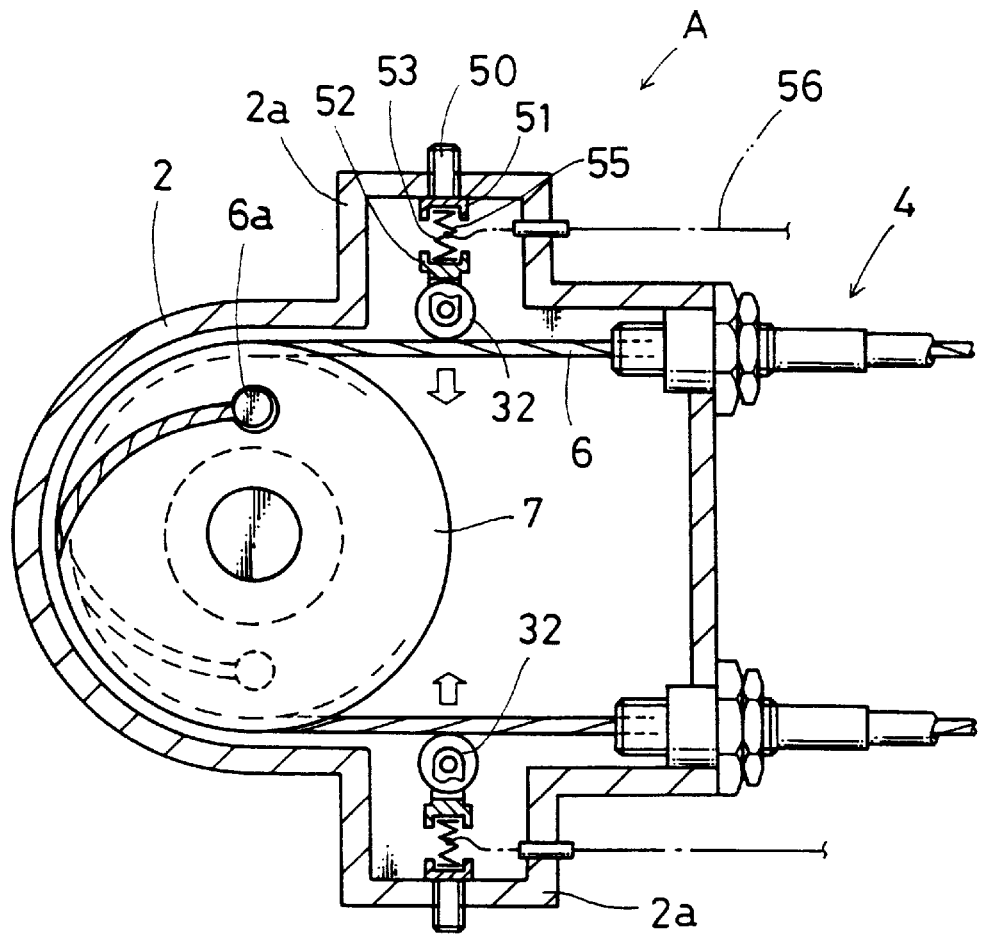
FIG. 8 is a view similar to FIG. 7 showing still another embodiment of the tensioner.
Figure 9:
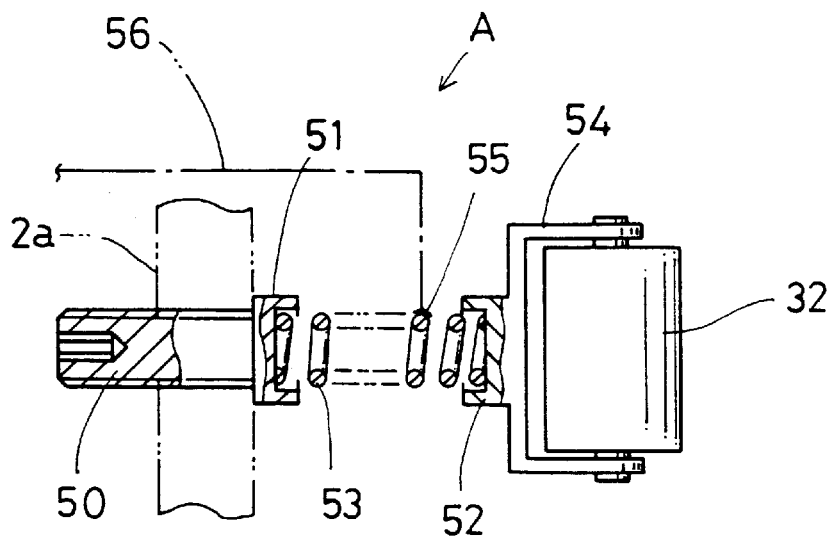
FIG. 9 is a scale-enlarged side view showing an important part of the tensioner shown by FIG. 8, as partially broken away.

FIGS. 8 and 9 show still another embodiment of the invention in which the casing 2 is formed at laterally opposite sides with bulges 2a. A forward end of a screw rod 50 threaded into each bulge 2a is provided with a spring shoe 51, on one hand, and a supporting frame 54 of each roller 32 is integrally formed with a spring shoe 51, on the other hand. A compression coil spring 53 extends between these spring shoes 51, 52 so that the roller 32 functions to tension the inner cable 6 by pressing it inward as indicated by arrows under the biasing effect of said compression coil spring 53. Tension of the inner cable 6 depends on an amount by which the screw rod 50 is threaded into the casing 2. A variation of the tension is converted by the strain gauge 55 fixed to the compression coil spring 53 to corresponding electric signal and output via lead wire 56.

With respect to the remaining construction and operation, this embodiment is similar to the previously described two embodiments. This embodiment is advantageously characterized in that a tension of the inner cable 6 can be regulated by adjusting an amount by which the screw rod 50 is threaded into the casing 2.

Figure 10:
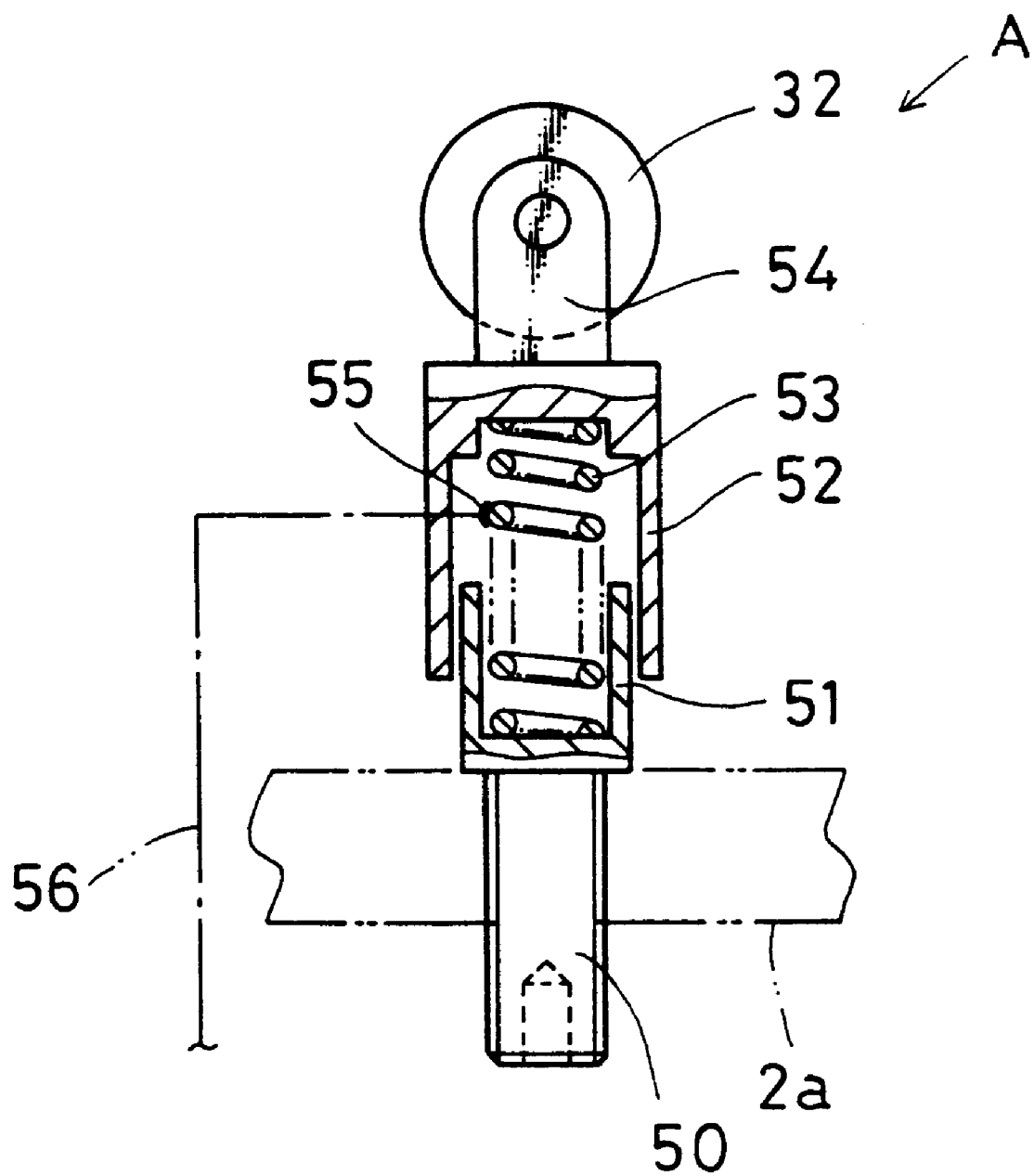
FIG. 10 is a sectional view showing a variant of the tensioner shown by FIG. 9, as partially broken away.

FIG. 10 shows a variant of the tensioner A shown by FIGS. 8 and 9, in which the spring shoe 51 on the side of the screw rod 50 and the spring shoe 52 on the side of the roller 32 are cylindrically extended so that they may telescopically overlap each other. Such arrangement is effective to prevent the spring 53 from being buckled.

I claim:

1. Power steering device for motor car comprising a power cylinder having a piston rod coupled at its longitudinally opposite ends to front wheels via a steering link mechanism, a control valve of rotary type for direction control of pressurized fluid supplied to and simultaneously discharged from said power cylinder, a drum on the side of said valve coupled to a rotor of said control valve, another drum directly coupled to a steering wheel, and a pair of control cables each consisting of a flexible outer tube and an inner cable slidably extending within said outer tube and wound around said two drums so that said inner cables are alternately subjected to a tensile force as said drum directly coupled to said steering wheel is rotated in alternate directions, said power steering device for motor car being characterized by that at least one of two casings separately housing said two drums is provided with a tensioner adapted to tension the inner cable by pressing rollers against said inner cables under a biasing effect of a spring.

2. Power steering device for motor car according to claim 1, wherein said spring comprises a torsion coil spring biasing said rollers to press said pair of inner cables inward.

3. Power steering device for motor car according to claim 1, wherein said spring comprises a torsion coil spring biasing said rollers to press said pair of inner cables outward.

4. Power steering device for motor car according to claim 1, wherein said spring comprises a compression coil spring biasing said rollers to press said pair of inner cables inward.

5. Power steering device for motor car according to any one of claims 1 through 4, wherein said casing is provided with a sensor adapted to detect an amount of deformation occurring in said spring and there is provided an alarm device adapted to be actuated when an output signal from said sensor exceeds a predetermined value.

* * * * *